April 2, 1946.    D. ROEDER ET AL    2,397,809
MILITARY VEHICLE
Filed March 14, 1944    2 Sheets-Sheet 1
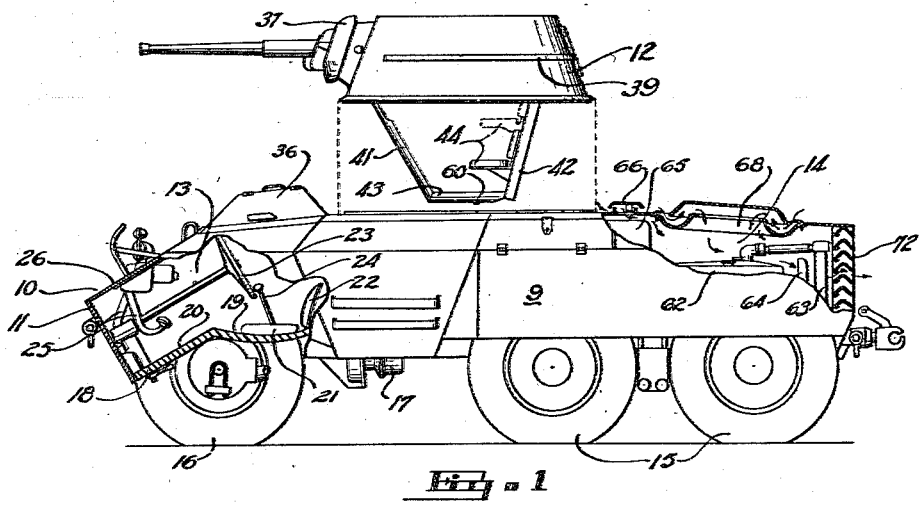
Fig. 1
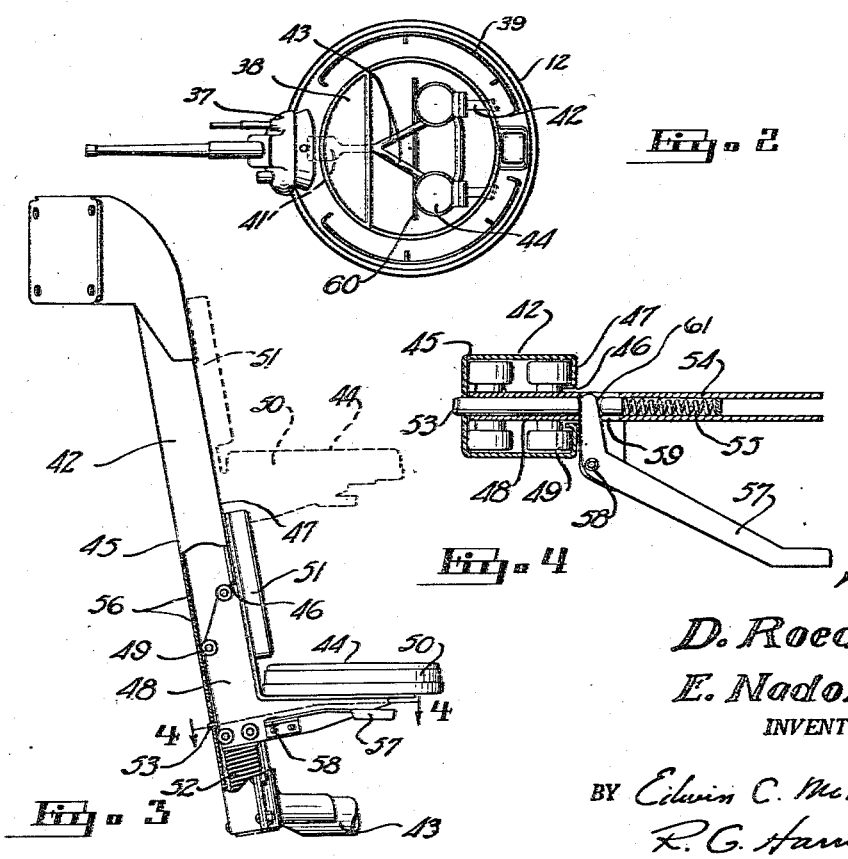
Fig. 2
Fig. 3
Fig. 4
D. Roeder
E. Nador
INVENTORS
BY Edwin C. McRae
R. G. Harris
Attorneys Patented Apr. 2, 1946

2,397,809

UNITED STATES PATENT OFFICE 2,397,809

MILITARY VEHICLE

Dale Roeder, Wayne, and Emory Nador, Detroit, Mich., assignors to Ford Motor Company, Dearborn, Mich., a corporation of Delaware Application March 14, 1944, Serial No. 526,363

3 Claims. (Cl. 89—36)

This invention relates to military vehicles; and, more particularly, to the interior arrangement thereof with reference to the provision made for the accommodation of both combat and operating personnel.

The object of this invention is to devise an interior arrangement for a military vehicle in which complete accessibility is maintained to both operating and combat positions. While vehicles having a revolving turret are particularly involved, many of the principles are applicable to vehicles of other types. In vehicles having a turret, provision must be made for the accommodation of the combat personnel in it and this has been accomplished by a design in which the turret structure not only serves to carry the turret crew, but includes a retractable seating arrangement while providing a minimum of obstruction within the body of the vehicle. Another object is to obtain a low silhouette which is an essential in most military vehicles. Another object is to perfect the body arrangements for a wheeled vehicle, as opposed to the track vehicle, in which the operating, combat and motive power sections are so related to the structure as a whole as to obtain maximum protection with a practicable minimum of armor weight.

One of the principal advantages of the present invention is that while adequate room is allowed for both the operating and combat personnel, as well as intercommunication between respective positions, the over-all height which governs the effective silhouette of the vehicle is kept to a minimum. Another advantage is that, following this arrangement, a vehicle is obtained in which it is possible to use a substantially imperforate floor, the main operating controls being mounted within the hull of the vehicle. Other advantages residing in the use of structural elements of the turret provide a readily adjustable seat for the combat personnel carried in it and the construction of the seat itself. Still another advantage is the integration of the motive power compartment with the remainder of the vehicle and the measures taken for bulletproofing it while providing adequate ventilation and cooling air.

With these and other objects in view, the invention consists in the arrangement and construction of the various parts of the vehicle as described in the specification, claimed in the claims, and shown in the drawings, in which:

Figure 1 is a side elevation of an armored car, portions thereof being broken away to show the interior arrangement and the turret thereon being shown in exploded relation to show its structural members.

Figure 2 is a plan view of the turret.

Figure 3 is an elevation of one of the turret's structural members.

Figure 4 is a section showing the locking device taken on the line 4—4 of Figure 3.

Figure 5:
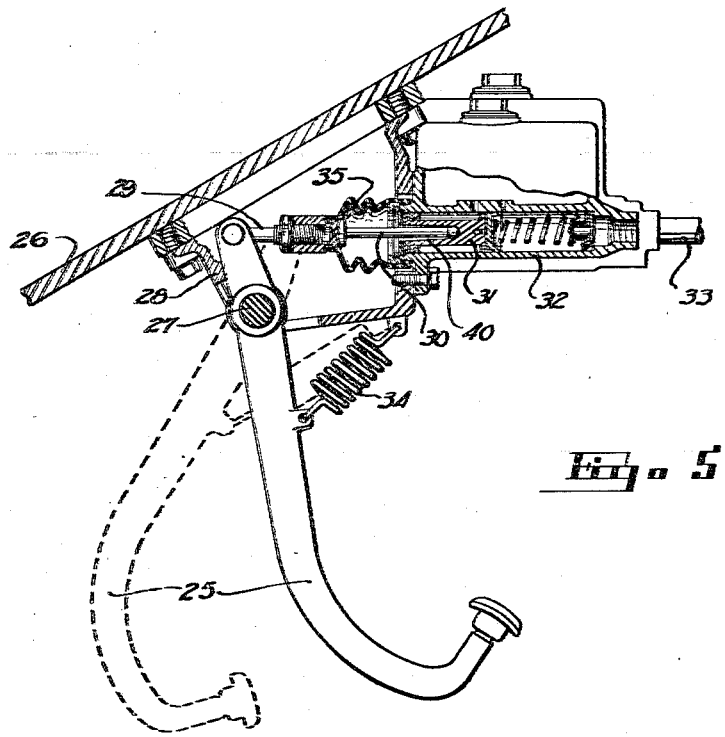
Figure 5 is an elevation, partly in section, of one of the control members in the driver's compartment.

Referring to Figure 1, 10 indicates, generally, an armored car having a hull 11, a rotatable turret 12, an operating compartment 13, and an engine compartment 14. The particular vehicle shown has a six-wheel drive, the rear wheels 15 and the front wheels 16 being driven through a transfer case 17, the details of which are not shown as they form no part of this invention. To maintain the low silhouette desired, the floor 18 and sides 9 of the hull 11 serve as the frame members, the conventional frame usually found in automotive vehicles being omitted. This permits a much lower mounting and the floor formed as at 19 and 20 affords a seat and an extended leg compartment for the driver. A seat cushion 21 and a hinged back 22 complete the driver's seat. The steering wheel 23 and the gearshift lever 24 are arranged as usual, while the clutch and the brake pedals 25 are mounted on the top skin 26 of the hull as opposed to the usual practice of mounting them through the floor. The particular mounting means used is shown on a larger scale in Figure 5, in which a pedal 25 is shown in normal position in full line, and in extreme position in dotted line. The pedal 25 is pivoted at 27 to a housing 28 secured to the skin 26 and a short lever 29 actuates the piston 31 of the hydraulic master cylinder 32 from which a duct 33 leads rearwardly within the hull of the vehicle to the clutch or throttle where similar cylinders operate the particular mechanism involved. A spring 34 restores the pedal to its normal position when not being depressed, and a flexible shield 35 prevents the leakage of hydraulic fluid to the driver's compartment. It will be noted that the connecting rod 30 is seated in recess 49 in the piston 31, which flares outwardly to allow for the difference in angular positions throughout the sweep of the arm 29.

A hatch 36 is located immediately above the seat 19 and, when not engaged in combat, may be opened forwardly to permit extended vision to the operator. Also provided, though not shown, are the usual slits and periscope which are used when the hatches must be closed. Figure 1, particularly, indicates how the over-all height of the vehicle has been cut down through the operating portion of the vehicle, and how the solid floor is obtained by keeping the principal controls within the hull of the car proper, improving the protection afforded by the floor and the characteristics of the vehicle in amphibious operation.

The turret 12 is rotatably mounted on a track construction, which is shown in detail in our copending application Serial No. 526,362 filed this day and includes a gun mount indicated generally at 37. The top of the turret 12 is open except in the forward sector 38, although fabric covers are sometimes provided and can be lashed to the bars 39 to make the interior of the vehicle weatherproof. In laying the gun, changes in azimuth are obtained by rotating the entire turret—as by the control shown in copending application Serial No. 498,152—the adjustment of elevation being obtained through the gun mount 37. This, of course, requires that the crew be carried by the turret, and in the past it has been accomplished by building a basket which extended from the turret downwardly into the body of the vehicle and which carried the crew, racks for ammunition, and the like. This necessarily blocked off a large portion of the interior of the vehicle, making it almost impossible to move with any degree of freedom inside it. In the present instance, the conventional basket is replaced by structural members arranged in the form of a reversed tripod comprising a forward strut 41, two spaced rear struts 42 and two bottom struts 43, which vee out from the bottom of the forward strut 41 to the respective rear struts 42. The forward and bottom struts 41 and 43 are usually made from tubular stock, but the rear strut is fabricated from sheet stock to form a support and guide for the seats 44 provided for the gunners.

As best shown in Figure 4, at least the midportion 45 of the rear struts 42 is rectangular in section having a slit 46 in the forward face 47, and a carriage 48 is mounted on the wheels 49 located within the body of strut. The carriage 48 is generally L-shaped (see Figure 3) and has a cushion 50 secured to base leg of the L and a back cushion 51 mounted on the upright. A heavy spring 52 is interposed between the base of the L and the closed bottom of the strut 42 and tends to urge the seat combination upwardly in the strut. A plunger lock, shown in some detail in Figure 4, is mounted on the base leg of the carriage and includes a bolt 53 mounted in a tube 54 formed in the carriage and normally urged rearwardly by a spring 55 projecting the bolt 53 into one of a series of apertures 56 on the rear wall of the rear strut 42. A control lever 57 vertically pivoted at 58, extends through a slot 59 in the tube 54 and engages a recess 61 in the bolt 53. Operation of the lever in a horizontal plane, as indicated by the arrow in Figure 4, tends to withdraw the bolt 53 from the aperture 56, and the carriage is then free to slide upon the rear strut 42. The advantage of this construction is that while the normal firing position for the gunner is indicated in dotted line in Figure 3—which is the extreme upper position—when the vehicle is under attack, the crew can withdraw rapidly to the protection of the turret. With the present construction, this can be effected merely by hitting the lever 57, which disengages the bolt and immediately permits the seat to slide down against the pressure exerted by the spring 52. The latter is designed so that the operator's weight is sufficient to depress it, but is strong enough so that when the operator desires to return to the upper position, he need only lift a portion of his weight and, as by pushing against the foot bar 60, the lever 57 again being operated, the seat will immediately return to its upper position. The uppermost position of the seat is governed by the conformation of the rear strut and the locking aperture is provided in that neighborhood. However, other adjustments are possible depending upon circumstances and a number of the apertures 56 are provided throughout the extent of the strut.

It will be noted from Figure 1 that while the full provision is made for carrying the combat crew in the turret and even for furnishing seats which may be adjusted instantaneously to any desired position, the internal turret structure is entirely open so that it is easy to move through it within the body of the vehicle and obtain convenient access to its various interior portions. As the floor of the hull is substantially level (even the sloping section 20 being kept at minimum angularity) the driver may sit directly on the floor thereby lowering the over-all vehicle height required for his accommodation. The upper mounting for the control pedals contributes to the driver's comfort since his legs may rest on and be supported by the floor when the pedals are not being operated. The hull, itself, is substantially unencumbered rearwardly of the driver's section, the only obstacle being the turret basket. However, this has been reduced to three downwardly extending members, so that the basket—as such—may be entered from any direction without difficulty and does not reduce accessibility. Indeed, with the precise inverted tripod arrangement shown, in which a single leg or member is disposed at the front of the basket (the normal operating position) coupled with the substantially level floor throughout, movement between the driver's section and the turret basket is quite easy despite the generally constricted quarters. When the seat back 22 is pivoted forwardly, the operator may pass from the driver's section to the turret or vice versa, without difficulty.

Figure 6:
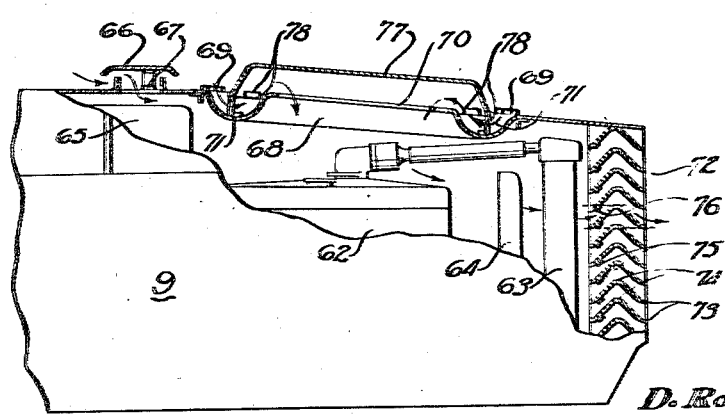
Figure 6 is a side elevation of the rear portion of the vehicle, portions thereof being broken away to show the protective grille and the provision for circulation of cooling and ventilating air to the engine.

Continuing rearwardly in the vehicle, the engine compartment 14 is reached, in which is mounted the fuel tank 65 and an engine 62, having a radiator 63 and a pusher type fan 64. Access to the tank is through the hatch 66, which extends substantially across the vehicle, is divided in the center and hinged at the ends as at 67. However, this hatch is spaced from the hull throughout and provides ventilation over the fuel tank 65 and into the engine compartment 14. Also provided are the engine hatches 68, which are also hingedly secured at 69 at the side of the vehicle and mate at the center line. Each hatch 68 has a channeled rim 71 entirely around it, is cut away in the center as at 70 and has a spaced cover 77 over the center supported by braces 78, giving free access to air, but full protection against the entry of missiles to the engine chamber and the fan. This entering air is forced through the radiator 63 and out through the radiator grille 72, which is of unique design. This comprises a series of spaced vanes 73 substantially sinusoidal in section, the crest 74 of each vane being located interiorly of the grille, the depressions being at the inner and outer surfaces of the grille and successively overlapping the horizontal projection of the crest of the preceding vane, as thus shown in Figure 6. This construction is highly effective in reducing the velocity of any object directed against the grille and, as a further protection to the radiator which is positioned immediately behind the grille, a secondary baffling means in the form of a bar 75 extends along the underside of each vane just adjacent the depression of the section. Specifically, the bar is preferably placed, so that its upper surface is just aligned with the crest of the succeeding vane as indicated by the dotted line 76. With this construction, it has been found that any missile which does not have sufficient force to destroy the vane structure will be effectively prevented from reaching the radiator even though it follows the course prescribed by the configuration of the vane, and will drop harmlessly down from the inner face of the grille. At the same time, the grille presents the maximum available opening for the escape of the coolant air from the engine chamber.

The particular advantages of the various constructions described have been pointed out above. It suffices to say that the arrangement shown, particularly in its application to military vehicles, has the outstanding advantage of providing a low silhouette vehicle with maximum internal availability, complete protection for the motive power, and a general turret arrangement permitting the combat personnel to operate from the most convenient and protected position.

Some changes may be made in the specific instructions as shown herein, and it is the intention to cover by the claims such modifications as may reasonably be included within the scope thereof.

The invention claimed is:

1. In an armored vehicle, a vehicle having a hull, a turret rotatably supported adjacent its edges on said vehicle, a supporting structure secured to said turret and extending downwardly into the hull of said vehicle, said structure comprising a plurality of members forming an open framework, at least one of said members being substantially vertical, a seat carriage slidably mounted on said last-named member, spring means within said vertical member normally urging said seat carriage upwardly on said member, a plurality of vertically spaced holes on said last-named member, a reciprocable bolt adapted to be projected into engagement with one of said holes to lock said carriage in selected vertical position, spring means resiliently urging said bolt into such engagement, and means on said carriage to withdraw said bolt from said engagement.

2. In an armored vehicle construction, a vehicle having an enclosed hull, a turret rotatably supported on said vehicle, a supporting structure secured to said turret and extending downwardly into the body of said vehicle, said structure comprising a pair of substantially vertical rear struts and a forward strut and a substantially horizontal triangular base member, said struts being connected to said turret at their upper ends and to the respective apices of said base member at their lower ends defining an open framework, a seat slidably mounted on at least one said rear strut, spring means within said last-named rear strut normally urging said seat upwardly on said strut, and locking means to secure said seat in selected position thereon.

3. The structure of claim 2 further characterized in that said rear strut is substantially a hollow rectangle in section and has a slot formed in its forward edge, an L-shaped carriage having one leg extending into said slot and having wheels thereon bearing on the front and rear inner surfaces of said rear strut, said spring enclosed in said strut beneath said carriage, said seat attached to the other leg of said carriage, a plurality of vertically spaced holes in the rear edge of said strut, a bolt reciprocally mounted in said other leg of said carriage with resilient means normally projecting said bolt through said slot into engagement with one of said holes, and means on said other leg immediately beneath said seat to withdraw said bolt from such engagement.

DALE ROEDER.
EMORY NADOR.